United States Patent
Shiraishi

(10) Patent No.: US 12,061,424 B1
(45) Date of Patent: Aug. 13, 2024

(54) IMAGE READING DEVICE WITH LIGHT NOISE REDUCTION CHARACTERISTICS

(71) Applicant: TOSHIBA TEC KABUSHIKI KAISHA, Tokyo (JP)

(72) Inventor: Takashi Shiraishi, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/111,026

(22) Filed: Feb. 17, 2023

(51) Int. Cl.
| | |
|---|---|
| G03G 15/04 | (2006.01) |
| G02B 3/00 | (2006.01) |
| G02B 5/08 | (2006.01) |
| G02B 5/28 | (2006.01) |
| G03G 15/00 | (2006.01) |
| G03G 21/16 | (2006.01) |

(52) U.S. Cl.
CPC ....... *G03G 15/04018* (2013.01); *G02B 3/005* (2013.01); *G02B 5/08* (2013.01); *G02B 5/28* (2013.01); *G03G 15/04* (2013.01); *G03G 15/04036* (2013.01); *G03G 15/6502* (2013.01); *G03G 15/752* (2013.01); *G03G 21/1676* (2013.01); *G03G 21/1685* (2013.01)

(58) Field of Classification Search
USPC .......................................................... 399/33
See application file for complete search history.

(56) References Cited

U.S. PATENT DOCUMENTS

2013/0314754 A1  11/2013  Shiraishi
2019/0354035 A1*  11/2019  Shiraishi ............ G03G 15/0409

FOREIGN PATENT DOCUMENTS

JP  2018-128643  8/2018
JP  2021-093630  6/2021

* cited by examiner

*Primary Examiner* — Quana Grainger
(74) *Attorney, Agent, or Firm* — Amin, Turocy & Watson, LLP

(57) ABSTRACT

An image reading device includes a lens mirror array, a photoelectric conversion section, and a diaphragm section. The lens mirror array includes a plurality of optical elements. Each of the optical elements includes an incident-side lens surface, an upstream-side reflection surface, a downstream-side reflection surface, an emission-side lens surface, and a stray light reflection surface. The incident-side lens surface transmits and converges reflected light from a read surface. The upstream-side reflection surface reflects light made incident via the incident-side lens surface. The downstream-side reflection surface reflects the light. The emission-side lens surface transmits and converges the light and images the light on an imaging surface. The stray light reflection surface reflects stray light. The photoelectric conversion section receives, photoelectrically converts, and outputs the reflected light. The diaphragm section is disposed between the read surface and the incident-side lens surface and includes a slit-like opening section.

20 Claims, 13 Drawing Sheets

IMAGE READING DEVICE WITH LIGHT NOISE REDUCTION CHARACTERISTICS

FIELD

Embodiments described herein relate generally to an image reading device such as a scanner of a copying machine, an OCR (Optical Character Reader), and a scanner that reads a two-dimensional barcode.

BACKGROUND

For example, a scanner of a copying machine installed in a workplace includes a light source that illuminates an original, a light receiving element such as a CCD sensor, and optical elements such as a lens and a mirror that guide reflected light from the original to the light receiving element and image the reflected light. The light source, the light receiving element, and the optical elements are long components extending in a main scanning direction and are held by a holder. The holder is movable in a sub-scanning direction with respect to the original. As the optical elements, for example, there is a lens mirror array obtained by integrating the lens and the mirror.

If an image of the original is read, light emitted from the light source is irradiated on a long predetermined region extending in the main scanning direction of the original and reflected light from the region is imaged on the light receiving element via the lens mirror array. The light receiving element photoelectrically converts the received light and outputs the light as image information of the region. The holder is moved in the sub-scanning direction, the original is scanned in the sub-scanning direction, and image information of the entire region of the original is acquired. The reflected light from the original is made incident on the lens mirror array from all directions. In order to cut stray light to be noise of effective light made incident on the light receiving element, the lens mirror array includes a light blocking film in a predetermined part of the surface of the lens mirror array. Since the light blocking film is applied and formed in a fine uneven portion of the surface of the lens mirror array, an application spot, peeling, or the like sometimes occurs. In this case, the stray light is likely to be guided to the light receiving element via a part where the application spot, the peeling, or the like occurs.

DETAILED DESCRIPTION

Figure 1:
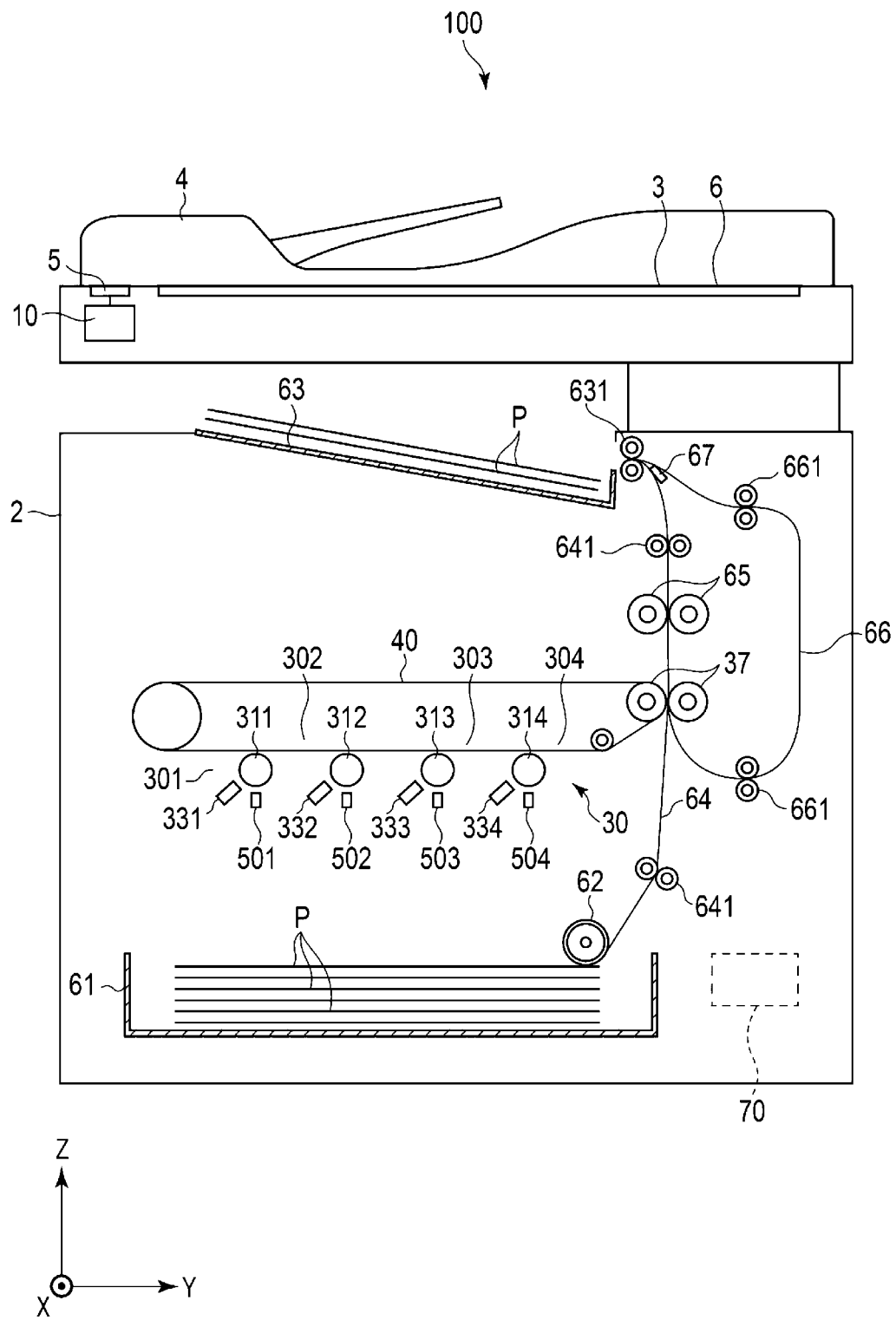
FIG. 1 is a schematic diagram illustrating an image forming apparatus.

An image reading device according to an embodiment includes a lens mirror array, a photoelectric conversion section, and a diaphragm section. The lens mirror array includes a plurality of optical elements integrally arrayed in a first direction. Each of the optical elements includes, on a surface thereof, an incident-side lens surface, an upstream-side reflection surface, a downstream-side reflection surface, an emission-side lens surface, and a stray light reflection surface. The incident-side lens s transmits and converges reflected light from a read surface. The upstream-side reflection surface reflects light made incident via the incident-side lens surface. The downstream-side reflection surface reflects the light reflected on the upstream-side reflection surface. The emission-side lens surface transmits and converges the light reflected on the downstream-side reflection surface and images the light on an imaging surface. The stray light reflection surface is inclined with respect to an imaginary surface orthogonal to the first direction and disposed continuously to a peripheral edge of the upstream-side reflection surface and reflects, with respect to effective light from the read surface imaged on the imaging surface, stray light to be noise of the effective light in a direction separating in a second direction orthogonal to the first direction. The photoelectric conversion section includes the imaging surface, receives, on the imaging surface, the reflected light from the read surface guided by the lens mirror array, photoelectrically converts the received reflected light, and outputs the reflected light as image information. The diaphragm section is disposed between the read surface and the incident-side lens surface of the lens mirror array, includes a slit-like opening section extending in the first direction that defines width in the second direction of the reflected light such that the reflected light from the read surface passes within a range of an effective width in the second direction of the incident-side lens surface, and includes a surface that is in contact with the lens mirror array on both sides in the second direction of the opening section.

The embodiment is explained below with reference to the drawings. In the drawings referred to in the following explanation, scales of sections are sometimes changed as appropriate. In the drawings, components are sometimes illustrated to be simplified or omitted in order to facilitate understanding of explanation. In the figures, a direction parallel to rotation axes of photoconductive drums 311 to 314 is indicated by an arrow X, a moving direction of an original reading device 10 orthogonal to the X direction is indicated by an arrow Y, and a vertical direction orthogonal to the X direction and the Y direction is indicated by an arrow Z. In the following explanation, the arrow X direction is sometimes referred to as main scanning direction and the arrow Y direction is sometimes referred to as sub-scanning direction. The X direction is the first direction described in the claims of this application, the Y direction is the second direction described in the claims of this application, and the Z direction is the third direction described in the claims of this application. A horizontal surface orthogonal to the Z direction is sometimes referred to as XY plane, a surface orthogonal to the Y direction is sometimes referred to as XZ plane, and a surface orthogonal to the X direction is sometimes referred to as YZ plane. The sub-scanning direction is not limited to the direction parallel to the arrow Y. For example, a rotating direction of the photoconductive drums 311 to 314 is also referred to as sub-scanning direction.

An image forming apparatus 100 illustrated in FIG. 1 is a so-called multifunction peripheral including, for example, a print function, a copy function, and a scan function.

The image forming apparatus 100 includes a housing 2 that is an outer shell of the apparatus. A transparent original table glass 3 on which an original D (FIG. 2) is set and a reading glass 5 are present on the upper surface of the housing 2. The original table glass 3 and the reading glass 5 are disposed side by side in the Y direction. An illustrated upper surface of the original table glass 3 parallel to the XY plane and an illustrated upper surface of the reading glass 5 are surfaces disposed in flush with each other on the same horizontal surface, a read surface DS (FIG. 2) on which an image to be read from the original D is formed coming into contact with the surfaces.

An auto document feeder (ADF) 4 is present on the original table glass 3 and the reading glass 5. The ADF 4 is capable of opening and closing the original table glass 3 and the reading glass 5. The ADF 4 functions as an original cover for pressing the original D placed on an original placing surface 6 that is the upper surface of the original table glass 3. The ADF 4 has a function of feeding the original D in the Y direction through the reading glass 5.

The original reading device 10 is present in the housing 2 below the original table glass 3. The original reading device 10 is an example of the image reading device described in the claims of this application. The original reading device 10 is movable in the Y direction along the original table glass 3 by a driving mechanism and is fixable below the reading glass 5 (in a position illustrated in FIG. 1). The original reading device 10 is explained with reference to FIGS. 2 to 4.

Figure 2:
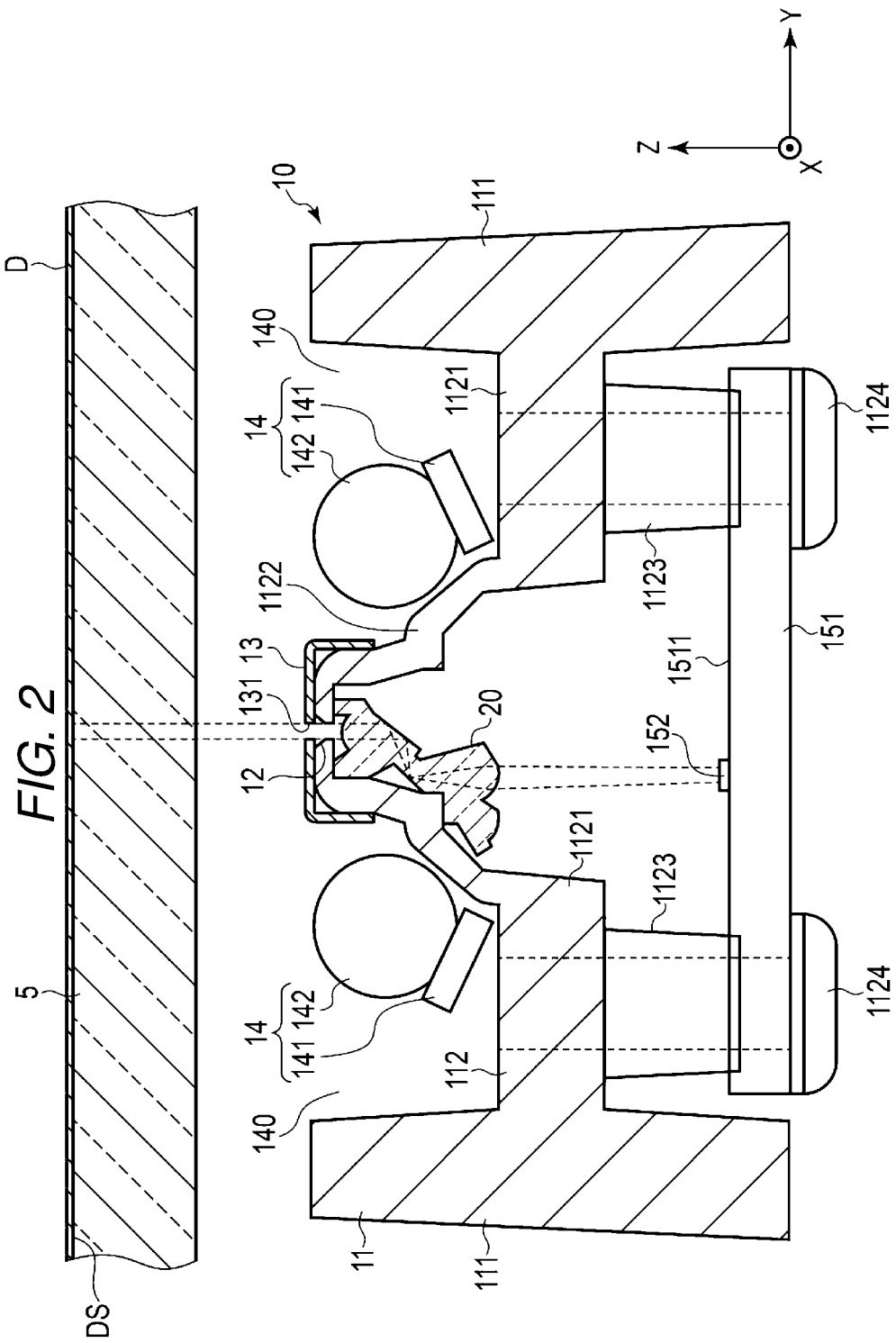
FIG. 2 is a sectional view illustrating an original reading device of the image forming apparatus illustrated in FIG. 1.

The original reading device 10 includes a long supporting body 11 extended in the X direction. The supporting body 11 has a long structure in which a cross section illustrated in FIG. 2 is made continuous in the X direction. The supporting body 11 integrally includes a pair of sidewall sections 111 separated and opposed in the Y direction and a supporting wall section 112 that connects the centers in the Z direction of the two sidewall sections 111. The pair of sidewall sections 111 extend substantially in parallel to the XZ plane. The supporting wall section 112 couples the inner surfaces opposed to each other of the sidewall sections 111. The supporting section wall 112 integrally includes rectangular plate-like two horizontal portions 1121 extending in directions opposed to each other from the inner surfaces of the sidewall sections 111 and substantially parallel to the XY plane and a swelling portion 1122 swelling upward from the end portions on the inner side opposed to each other of the two horizontal portions 1121.

Figure 3:
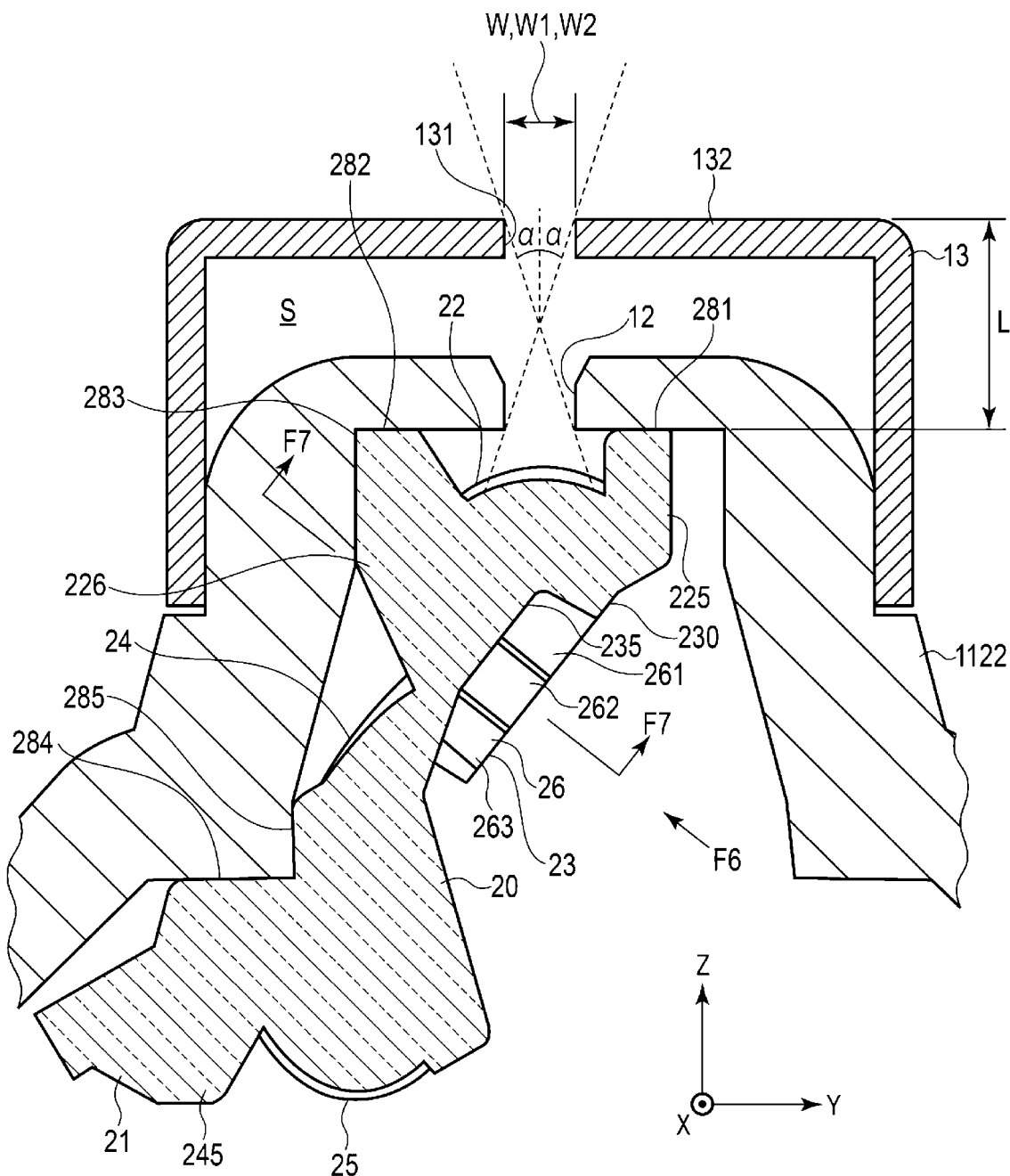
FIG. 3 is a partially enlarged sectional view enlarging and illustrating a main part of FIG. 2.

As illustrated in FIG. 3, the swelling portion 1122 includes, at the top of thereof, a slit 12 extending in the X direction. The slit 12 pierces through the swelling portion 1122. A light blocking member 13 having a shape obtained by bending, in a U shape, a substantially rectangular metal plate long in the X direction is present above the swelling portion 1122. A space S having a predetermined width in the Z direction is present between the swelling portion 1122 and the light blocking member 13. The light blocking member 13 includes a slit 131 extending in the X direction in a position separating from and opposed to the slit 12 of the swelling portion 1122 in the Z direction. The slit 131 pierces through a top wall 132 of the light blocking member 13.

In this embodiment, the width in the Y direction of the slit 12 of the swelling portion 1122 and the width in the Y direction of the slit 131 of the light blocking member 13 are set to the same width W. In this embodiment, the thickness in the Z direction of the top wall 132 of the light blocking member 13 is set smaller than the thickness in the Z direction of the top of the swelling portion 1122. A center line extending in the X direction of the two slits 12 and 131 overlaps the Z direction. The widths and the thicknesses of the slits 12 and 131, the width of the space S, and the like are explained in detail below.

The swelling portion 1122 and the light blocking member 13 are examples of the diaphragm section described in the claims of this application. The top wall 132 of the light blocking member 13 is an example of the first light blocking plate described in the claims of this application. The top of the swelling portion 1122 is an example of the second light blocking plate described in the claims of this application. The slits 131 and 12 are examples of the opening section described in the claims of this application. The slit 131 is an example of the first opening section described in the claims of this application. The slit 12 is an example of the second opening section described in the claims of this application. As illustrated in FIG. 2, the original reading device 10 includes two illumination devices 14 extending in the X direction. The two illumination devices 14 are present in positions sandwiching the swelling portion 1122 of the supporting body 11 in the Y direction. That is, the supporting body 11 includes, on both the sides in the Y direction of the swelling portion 1122, two recesses 140 long in the X direction in order to dispose the two illumination devices 14. The recesses 140 are portions surrounded by the sidewall sections 111 of the supporting body 11, the horizontal portions 1121 of the supporting wall section 112, and the swelling portion 1122. The supporting body 11 fixes, at a predetermined angle, the illumination devices 14 disposed in the recesses 140.

The illumination devices 14 include light source units 141 and light guide bodies 142. The light source units 141 include pluralities of light emitting elements such as LEDs disposed side by side in the X direction. The supporting body 11 fixes the light source units 141 to be inclined in the Y direction such that illumination lights emitted from the light source units 141 travel to a predetermined reading region elongated in the X direction of the read surface DS of the original D placed on the original placing surface 6 of the original table glass 3 (or passing on the reading glass 5). The light guide bodies 142 are disposed on emission sides of the illumination lights emitted from the light source units 141. The illumination devices 14 may be fluorescent tubes, xenon tubes, cathode ray tubes, organic EL, or the like other than the above. The illumination devices 14 are movable in the Y direction together with the supporting body 11.

Figure 4:
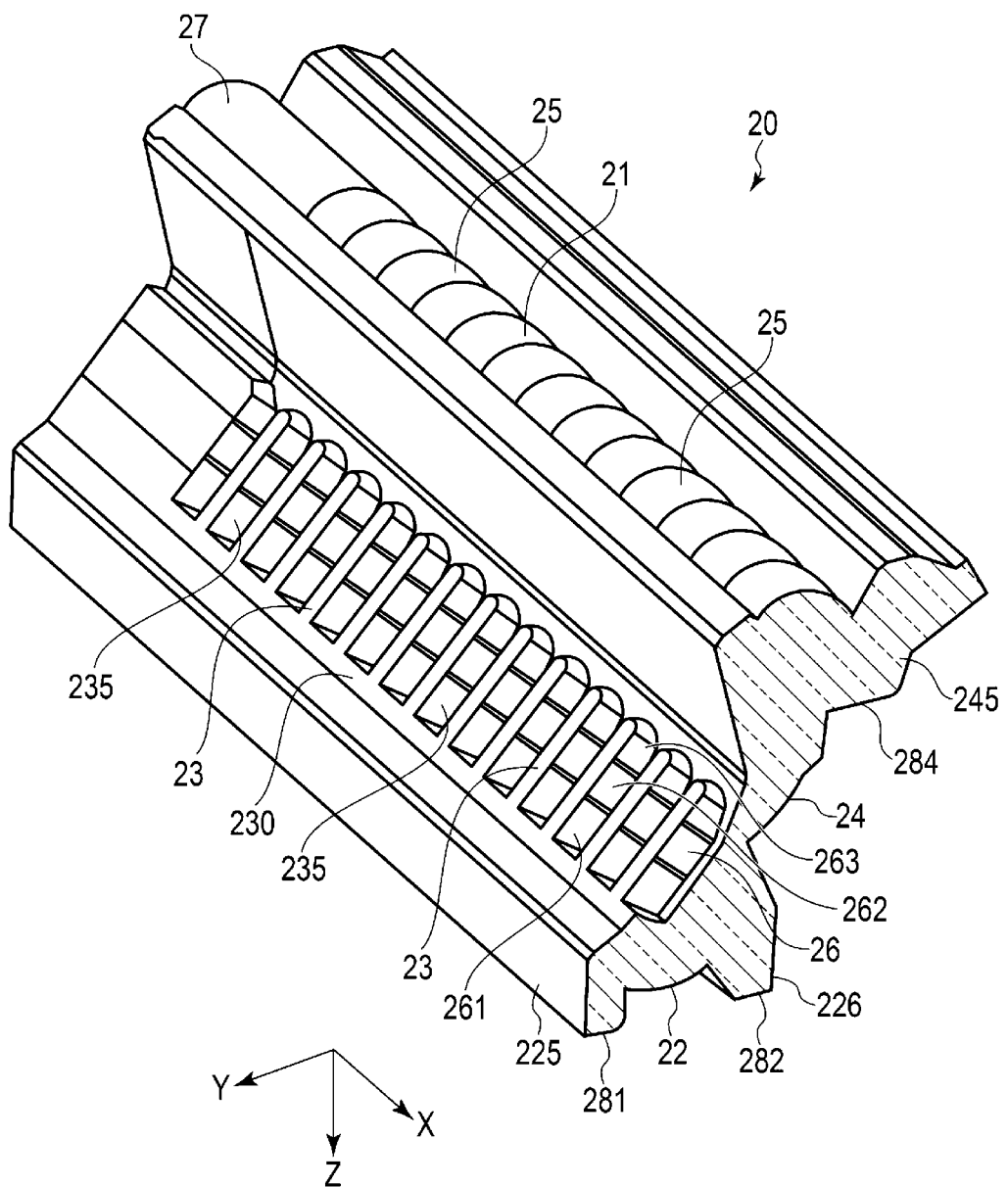
FIG. 4 is an exterior perspective view illustrating a part of a lens mirror array illustrated in FIG. 3.

The original reading device 10 includes a lens mirror array 20 between the two illumination devices 14 in the Y direction. The lens mirror array 20 is present on the inner side of the swelling portion 1122. The supporting body 11 fixes the lens mirror array 20 disposed on the inner side of the swelling portion 1122 in a posture in which an incident-side lens surface 22 (FIG. 3) is opposed to the slit 12. FIG. 4 is an exterior perspective view illustrating a part of the lens mirror array 20. The lens mirror array 20 has a long structure extending in the X direction. The lens mirror array 20 guides reflected light from the original D and causes a plurality of imaging elements 152 of an image sensor 15 explained below to form an erected image of the original D. The lens mirror array 20 is movable in the Y direction together with the supporting body 11. The lens mirror array 20 is explained in detail below.

The original reading device 10 includes an image sensor 15 long in the X direction. The image sensor 15 includes a substantially rectangular plate-like substrate 151 extending in the X direction and disposed in parallel to the XY plane and the plurality of imaging elements 152 mounted on a mounting surface 1511 of the substrate 151 side by side in the X direction. The imaging elements 152 are, for example, charge coupled devices (CCDs) or complementary metal oxide semiconductors (CMOSs) and convert received lights into electric signals and output the electric signals. The image sensor 15 is a line sensor in which the plurality of imaging elements 152 are arrayed in the X direction. A row of the imaging elements 152 may be one row or a plurality of rows lined up in the Y direction.

The image sensor 15 is fixed to, via a plurality of boss sections 1123 suspended in the Z direction from the horizontal portions 1121 of the supporting wall section 112 of the supporting body 11, the supporting body 11 in a state in which the image sensor 15 is separated below the supporting wall section 112. The boss sections 1123 include, in the centers thereof, screw holes through which screws 1124 are inserted and screwed. The image sensor 15 is fixed to the supporting body 11 in a positional relation in which light receiving surface of the plurality of imaging elements 152 are imaging surfaces on which light guided via the lens mirror array 20 is imaged. The plurality of imaging elements 152 have a fixed width in the Y direction.

If an image formed on the read surface DS of the original D is read by the original reading device 10, for example, the original reading device 10 is fixed under the reading glass 5 (a state illustrated in FIG. 1), the original D is fed by the ADF 4, and illumination light is irradiated on the read surface DS of the original D via the reading glass 5. Reflected light from the original D passes through the slit 131 of the light blocking member 13 and the slit 12 of the swelling portion 1122 of the supporting body 11 and is made incident on the incident-side lens surface 22 of the lens mirror array 20. The lens mirror array 20 guides the reflected light from the original D as explained below and images the reflected light on the light receiving surfaces of the plurality of imaging elements 152 of the image sensor 15.

The original reading device 10 photoelectrically converts the reflected light from the original D received by the plurality of imaging elements 152 of the image sensor 15 and outputs the reflected light as an image signal. The original reading device 10 reads, line by line in the main scanning direction, an erected image of the original D that passes on the reading glass 5 according to the operation of the ADF 4. If the original D passes on the reading glass 5 in the sub-scanning direction, the original reading device 10 reads an image on the entire surface (for a plurality of lines) of the read surface DS of the original D.

Alternatively, the original D may be set on the original table glass 3 and the original reading device 10 may be moved in the sub-scanning direction along the original table glass 3. In this case, similarly, the original reading device 10 can read, line by line in the main scanning direction, the erected image of the original D formed on the imaging surfaces of the plurality of imaging elements 152 of the image sensor 15 via the lens mirror array 20 and acquire the image of the entire surface of the read surface DS of the original D.

The slit 12 of the swelling portion 1122 of the supporting body 11 and the slit 131 of the light blocking member 13 function as an opening section for allowing the reflected light from the original D to pass and defining the width in the sub-scanning direction of the reflected light. Widths in the Y direction, disposition positions in the Y direction, and thicknesses in the Z direction of the slit 12 and the slit 131 are set such that the reflected light from the original D having passed through the slits 12 and 131 is made incident within an erective width extending in the Y direction of the incident-side lens surface 22 of the lens mirror array 20.

As illustrated in FIG. 1, the image forming apparatus 100 includes an image forming section 30 substantially in the center in the housing 2. The image forming section 30 includes a yellow unit 301, a magenta unit 302, a cyan unit 303, and a black unit 304 in a traveling direction of an intermediate transfer belt 40. Since the color units 301, 302, 303, and 304 of the image forming section 30 have substantially the same structure, the black unit 304 is representatively explained. Detailed explanation about the other color units 301, 302, and 303 is omitted.

Figure 5:
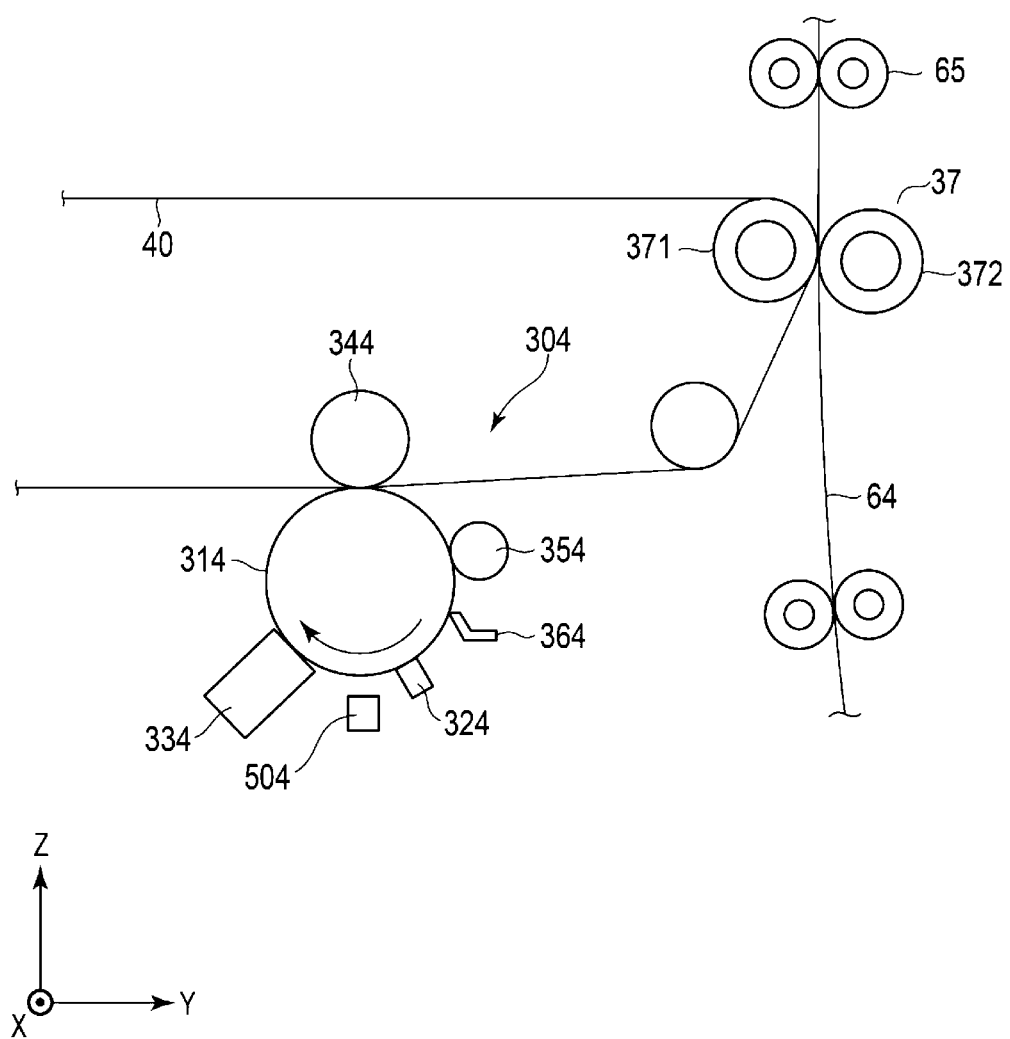
FIG. 5 is a schematic diagram illustrating a black unit of the image forming apparatus illustrated in FIG. 1.

As illustrated in FIG. 5, the black unit 304 includes, for example, a photoconductive drum 314, an electrifying charger 324, a solid state head 504, a developing device 334, a primary transfer roller 344, a cleaner 354, and a blade 364. The solid state head 504 includes the lens mirror array 20 explained above. The intermediate transfer belt 40 is wound around a plurality of rollers and endlessly stretched and travels in the counterclockwise direction in FIG. 5.

The photoconductive drum 314 has a rotation axis extending in the X direction. The photoconductive drum 314 rotates in a state in which the outer circumferential surface thereof is set in contact with the surface of the intermediate transfer belt 40. The primary transfer roller 344 is present on the inner side of the intermediate transfer belt 40 opposed to the photoconductive drum 314. The photoconductive drum 314 is rotated in an illustrated arrow direction (the clockwise direction) at the same peripheral speed as the peripheral speed of the intermediate transfer belt 40 by a driving mechanism.

The electrifying charger 324 uniformly charges the surface of the photoconductive drum 314. The solid state head 504 irradiates the surface of the photoconductive drum 314 with exposure light based on an image signal for color-separated black and forms an electrostatic latent image based on the image signal for black on the surface of the photoconductive drum 314. The developing device 334 supplies black toner to the electrostatic latent image formed on the surface of the photoconductive drum 314 and forms a black toner image on the surface of the photoconductive drum 314.

The primary transfer roller 344 transfers the black toner image formed on the surface of the photoconductive drum 314 onto the intermediate transfer belt 40 to be superimposes on toner images of the other colors. The cleaner 354 and the blade 364 remove toners remaining on the surface of the photoconductive drum 314. The color toner images transferred to be superimposed one on top of another on the intermediate transfer belt 40 move according to the traveling of the intermediate transfer belt 40.

A transfer roller pair 37 for transferring the toner images of the colors transferred to be superimposed one on top of another on the surface of the intermediate transfer belt 40 onto paper P is present on the downstream side of the black unit 304 in the traveling direction of the intermediate transfer belt 40. One transfer roller 371 is present on the inner side of the intermediate transfer belt 40. The intermediate transfer belt 40 is supported by the transfer roller 371. The other transfer roller 372 is opposed to the one transfer roller 371 across the intermediate transfer belt 40.

Referring back to FIG. 1, a paper feeding cassette 61 in which a plurality of pieces of predetermined-size paper P are stacked and stored is present near the lower end in the housing 2 of the image forming apparatus 100. The paper feeding cassette 61 can be, for example, drawn out and housed from the front surface of the housing 2. A pickup roller 62 that picks up the paper P at the uppermost end in a stacking direction among the pieces of paper P stored in the paper feeding cassette 61 is present at an illustrated upper right end of the paper feeding cassette 61. The pickup roller 62 rotates with the circumferential surface thereof in contact with the pieces of paper P to pick up the pieces of paper P one by one.

A paper discharge tray 63 is present in an upper part in the housing 2. The paper discharge tray 63 is present between the original table glass 3 and the image forming section 30 and discharges the paper P, on which an image is formed, into the body of the image forming apparatus 100. A conveying path 64 for conveying the paper P picked up from the paper feeding cassette 61 in the vertical direction toward the paper discharge tray 63 is present between the pickup roller 62 and the paper discharge tray 63. The conveying path 64 extends passing through a nip of the transfer roller pair 37 and includes a plurality of conveying roller pairs 641 and a conveyance guide. A paper discharge roller pair 631 for discharging the paper P to the paper discharge tray 63 is present at the terminal end of the conveying path 64. The paper discharge roller pair 631 is rotatable in both normal and reverse directions.

A fixing roller pair 65 is present on the conveying path 64 on the downstream side (an illustrated upper side) of the transfer roller pair 37. The fixing roller pair 65 heats and pressurizes the paper P conveyed via the conveying path 64 and fixes, on the surface of the paper P, a toner image transferred onto the surface of the paper P.

The image forming apparatus 100 includes a reversal conveying path 66 for reversing the paper P, on one surface of which an image is formed, and sending the paper P into the nip of the transfer roller pair 37. The reversal conveying path 66 includes a plurality of conveying roller pairs 661 and a conveyance guide for holding the paper P and rotating to convey the paper P. A gate 67 that switches a conveyance destination of the paper P between the conveying path 64 and the reversal conveying path 66 is present on the upstream side of the paper discharge roller pair 631.

If forming an image on the paper P, the image forming apparatus 100 rotates the pickup roller 62 to pick up the paper P from the paper feeding cassette 61 and conveys, with the plurality of conveying roller pairs 641, the paper P toward the paper discharge tray 63 via the conveying path 64. At this time, the image forming apparatus 100 sends color toner images transferred and formed on the surface of the intermediate transfer belt 40 into the nip of the transfer roller pair 37 to be timed to coincide with conveyance timing of the paper P, applies a transfer voltage to each of the color toner images with the transfer roller pair 37, and transfers the color toner images onto the surface of the paper P.

The image forming apparatus 100 conveys the paper P, onto which the toner images are transferred, through the fixing roller pair 65 to heat and pressurize the paper P, melts the toner images and presses the toner images against the surface of the paper P, and fixes the toner images on the paper P. The image forming apparatus 100 discharges the paper P, on which an image is formed in this way, to the paper discharge tray 63 via the paper discharge roller pair 631.

At this time, if a duplex mode for forming an image on the rear surface of the paper P as well is selected, the image forming apparatus 100 switches the gate 67 to the reversal conveying path 66 at timing immediately before the trailing end in a discharging direction of the paper P being discharged toward the paper discharge tray 63 passes through a nip of the paper discharge roller pair 631, reverses the paper discharge roller pair 631, and switches back and conveys the paper P. Consequently, the image forming apparatus 100 directs the trailing end of the paper P to the reversal conveying path 66, reverses the paper P, and sends the paper P into the nip of the transfer roller pair 37.

The image forming apparatus 100 forms, on the surface of the intermediate transfer belt 40, toner images based on image data to be formed on the rear surface of the paper P, causes the intermediate transfer belt 40, on which color toner images are retained, to travel, and sends the color toner images into the nip of the transfer roller pair 37. Further, the image forming apparatus 100 transfers the toner images onto and fixes the toner images on the rear surface of the reversed paper P and discharges the paper P to the paper discharge tray 63 via the paper discharge roller pair 631.

The image forming apparatus 100 includes a control section 70 that performs operation control for the mechanisms explained above. The control section 70 includes a processor such as a CPU and a memory. The processor executes programs stored in the memory, whereby the control section 70 realizes various processing functions. The control section 70 controls the original reading device 10 to thereby acquire image information from an original. The control section 70 controls the image forming section 30 to thereby form an image on the surface of the paper P. For example, the control section 70 inputs the image information read by the original reading device 10 into the image forming section 30. The control section 70 performs operation control for the pluralities of conveying roller pairs 641 and 661 and conveys the paper P through the conveying path 64 and the reversal conveying path 66.

The lens mirror array 20 is explained below with reference to FIGS. 3, 4, and 6 to 8.

As illustrated in FIG. 4, the lens mirror array 20 integrally includes a plurality of optical elements 21 arrayed in the X direction. The lens mirror array 20 can be formed by, for example, transparent resin or glass. The plurality of optical elements 21 have the same shape.

Each of the optical elements 21 includes, on the surface thereof, a plurality of surfaces substantially orthogonal to an imaginary boundary surface (a cross section of FIG. 3) between the optical element 21 and the optical element 21 adjacent thereto. The surfaces substantially orthogonal to the imaginary boundary surface are the incident-side lens surface 22, an upstream-side reflection surface 23, a downstream-side reflection surface 24, and an emission-side lens surface 25. The optical element 21 includes, on the surface thereof, a stray light reflection surface 26 slightly inclined in a predetermined direction with respect to the imaginary boundary surface. The incident-side lens surface 22, the downstream-side reflection surface 24, and the emission-side lens surface 25 are curved surfaces convex to the outer side. The upstream-side reflection surface 23 is a flat surface.

In the lens mirror array 20 in which the plurality of optical elements 21 are integrally connected in the X direction, incident-side lens surfaces 22, upstream-side reflection surfaces 23, downstream-side reflection surfaces 24, and emission-side lens surfaces 25 of the plurality of optical elements 21 are respectively continuous surfaces connected in the X direction. Stray light reflection surfaces 26 are surfaces continuous to the peripheral edges of the upstream-side reflection surfaces 23.

As illustrated in FIG. 4, the lens mirror array 20 includes, at both the ends in the X direction, extending portions 27 (only one is illustrated in FIG. 4) in which the optical elements 21 are not provided. If the lens mirror array 20 is held by a hand, it is desirable to hold the extending portions 27 not to touch a surface for guiding the reflected light from the original D.

The lens mirror array 20 includes, on surfaces other than the incident-side lens surface 22, the upstream-side reflection surface 23, the downstream-side reflection surface 24, the emission-side reflection surface 25, and the stray light reflection surface 26, five flat contact surfaces 281 282 283, 284 and 285 that are in surface-contact with the inner surface of the swelling portion 1122 of the supporting body 11. The lens mirror array 20 is positioned in the Z direction by setting two contact surfaces 281 and 282 or the contact surface 284 in surface-contact with the inner surface of the swelling portion 1122 opposed thereto and is positioned in the Y direction by setting two contact surfaces 283 and 285 in contact with the inner surface of the swelling portion 1122. The contact surfaces 281, 282, and 284 are surfaces substantially parallel to the XY plane. The contact surfaces 283 and 285 are surfaces substantially parallel to the XZ plane.

In a state in which the lens mirror array 20 is positioned in the supporting body 11, the inner surface of the swelling portion 1122 and the lens mirror array 20 are fixed by an adhesive in a plurality of parts separated in the X direction of the lens mirror array 20. At this time, parts fixed by the adhesive are parts that do not interfere with contact surfaces of the incident-side lens surface 22, the upstream-side reflection surface 23, the downstream-side reflection surface 24, the emission-side lens surface 25, the stray light reflection surface 26, and the five contact surfaces 281, 282, 283, 284, and 285 and the swelling portion 1122.

An optical axis of the incident-side lens surface 22 coincides with a principal ray of the reflected light from the original D made incident through the two slits 131 and 12. In other words, in a state in which the original reading device 10 is incorporated in the image forming apparatus 100, the supporting body 11 fixes the lens mirror array 20 in a posture in which the optical axis of the incident-side lens surface 22 and the principal ray of the reflected light from the original D coincide. The incident-side lens surface 22 has positive power for converging the reflected light from the original D.

Figure 6:
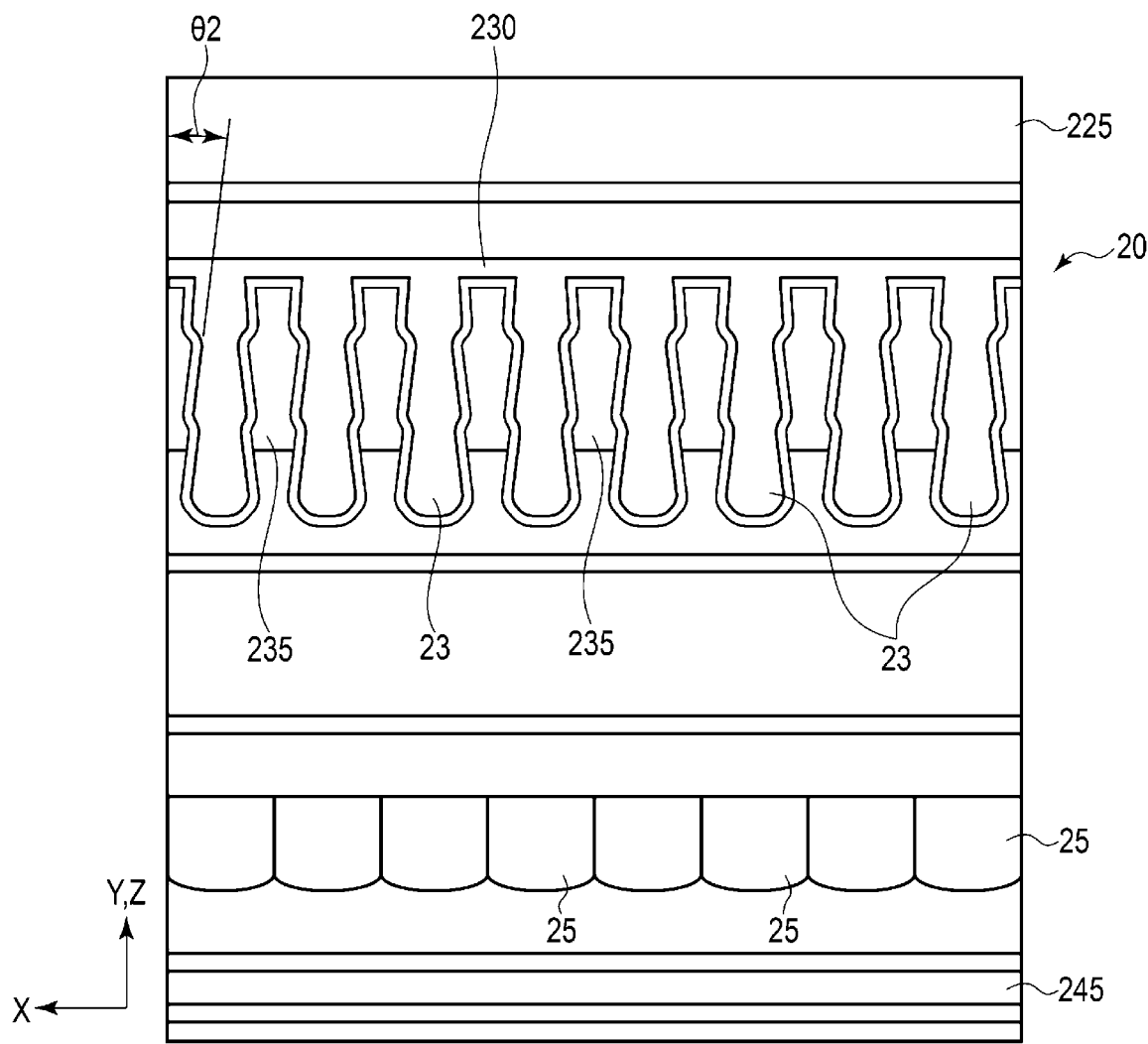
FIG. 6 is a plan view of the lens mirror array illustrated in FIG. 3 viewed from a direction of an arrow F6.

The upstream-side reflection surface 23 is formed in a combtooth shape as illustrated in FIGS. 4 and 6. The upstream-side reflection surface 23 is a flat surface inclined approximately 40° in the Y direction with respect to the optical axis of the incident-side lens surface 22. A projecting portion 225 long in the X direction is present between the incident-side lens surface 22 and the upstream-side reflection surface 23. The projecting portion 225 includes the contact surface 281 explained above on the surface thereof. A direction extending from the projecting portion 225 toward the emission-side lens surface 25 along the upstream-side reflection surface 23 is the longitudinal direction of the upstream-side reflection surface 23.

Figure 7:
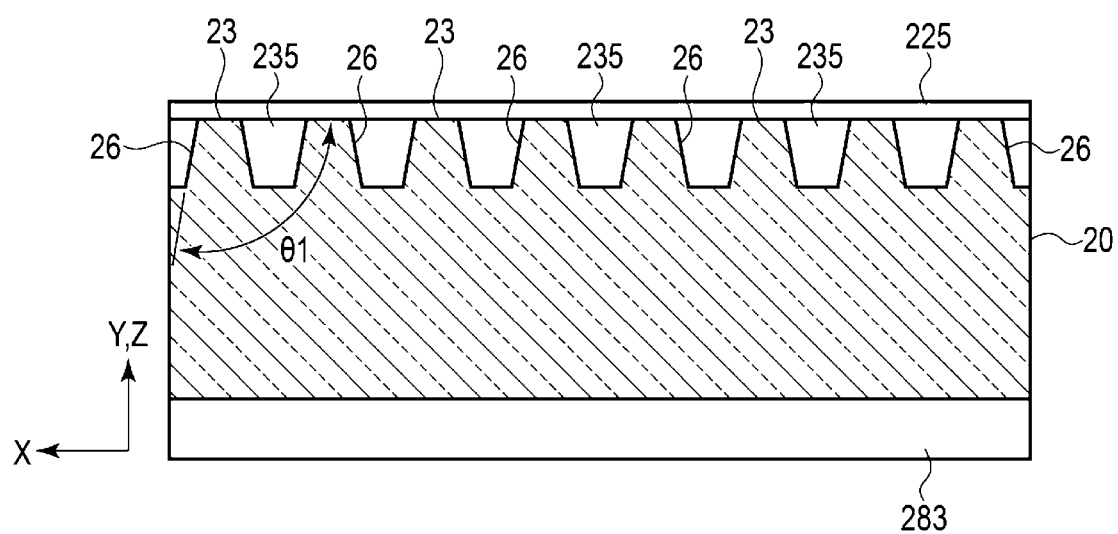
FIG. 7 is a sectional view of the lens mirror illustrated in FIG. 3 taken along F7-F7.

As illustrated in FIGS. 4 and 6, the end portions on the projecting portion 225 side of a plurality of upstream-side reflection surfaces 23 are connected by one flat surface 230 continuous in the X direction. As illustrated in FIGS. 6 and 7, a plurality of grooves 235 are present among the plurality of upstream-side reflection surfaces 23. The stray light reflection surface 26 is a surface continuous to the peripheral edge of the upstream-side reflection surface 23 and is a surface connected to the bottom of the groove 235. The stray light reflection surface 26 is a surface surrounding substantially the entire circumference other than the end portion on the projecting portion 225 side of the upstream-side reflection surface 23. The stray light reflection surface 26 is a surface inclined in a predetermined direction with respect to an imaginary surface orthogonal to the upstream-side reflection surface 23 (a surface parallel to the YZ plane). The inclining direction of the stray light reflection surface 26 is a direction in which stray light reflected on the surface deviates in the sub-scanning direction from the light receiving surface of the imaging element 152 of the image sensor 15.

Figure 8:
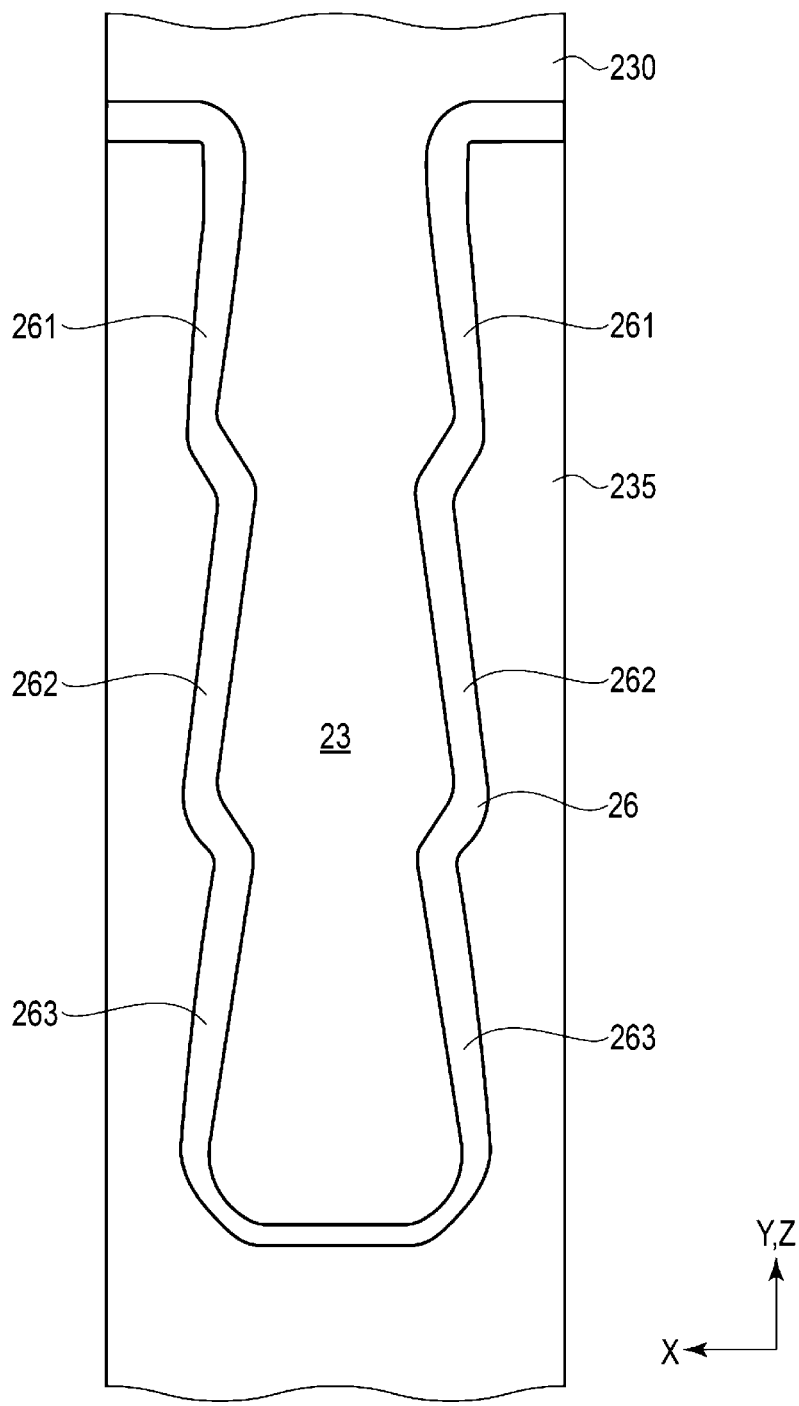
FIG. 8 is a partially enlarged view of a main part of FIG. 6.

More specifically, as illustrated in FIG. 8, the stray light reflection surface 26 includes three sets of inclined surfaces 261, 262, and 263 arranged in a step shape in the longitudinal direction of the upstream-side reflection surface 23. The three sets of inclined surfaces 261, 262, and 263 are respectively inclined at an obtuse angle with respect to the upstream-side reflection surface 23 and inclined in a direction expanding in a direction separating from the surface 230 with respect to the center line in the longitudinal direction of the upstream-side reflection surface 23. That is, as illustrated in FIG. 7, an angle $\theta 1$ between the stray light reflection surface 26 and the upstream-side reflection surface 23 is an obtuse angle. As illustrated in FIG. 6, the inclined surfaces 261, 262, and 263 are inclined at an angle $\theta 2$ with respect to the center line of the upstream-side reflection surface 23.

The downstream-side reflection surface 24 is present in a position for reflecting light reflected on the upstream-side reflection surface 23 toward the emission-side lens surface 25. The downstream-side reflection surface 24 also has power for slightly converging light. A projecting portion 226 long in the X direction is present between the incident-side lens surface 22 and the downstream-side reflection surface 24. The projecting portion 226 includes the two contact surfaces 282 and 283 explained above on the surface thereof.

The emission-side lens surface 25 images the light reflected on the downstream-side reflection surface 24 on the light receiving surface of the imaging element 152 of the image sensor 15. The emission-side lens surface 25 has power for converging light to be transmitted. A projecting portion 245 long in the X direction is present between the downstream-side reflection surface 24 and the emission-side lens surface 25. The projecting portion 245 includes the contact surface 284 explained above on the surface thereof. The contact surface 285 explained above is present between the downstream-side reflection surface 24 and the projecting portion 245.

If the two contact surfaces 281 and 282 are set in contact with the inner surface of the swelling portion 1122 to position the lens mirror array 20 in the Z direction with respect to the supporting body 11, the contact surfaces 281 282 of the lens mirror array 20 are in contact on both the sides in the Y direction of the slit 12 of the swelling portion 1122. Therefore, light other than light made incident via the slit 12 hardly enters a space surrounded by the inner surface of the swelling portion 1122, the two projecting portions 225 and 226, and the incident-side lens surface 22. By positioning the lens mirror array 20 in the Z direction with respect to the supporting body 11 in the vicinity of the slit 12 in this way, it is possible to highly accurately position the diaphragm section in the Z direction with respect to the incident-side lens surface 22 of the lens mirror array 20.

Each of the optical elements 21 of the lens mirror array 20 guides diffused light from an object point present on the read surface DS of the original D to be imaged at an imaging point present on the light receiving surface of the imaging element 152 of the image sensor 15. One optical element 21 images, on the light receiving surface, lights from a plurality of object points disposed side by side in the main scanning direction. For example, one optical element 21 images, on the light receiving surface, lights from object points disposed in width twice to six times as large as a pitch in the main scanning direction of the optical elements 21. The optical element 21 reflects light made incident via the incident-side lens surface 22 on the two reflection surfaces 23 and 24 and emits the light via the emission-side lens surface 25 to form an erected image of the object points at the imaging point present on the light receiving surface of the imaging element 152 of the image sensor 15.

Reflected light from the original D made incident on the incident-side lens surface 22 of the optical element 21 is diverging light. The incident-side lens surface 22 converges the diverging light and causes the diverging light to travel to the upstream-side reflection surface 23. Light reflected on the upstream-side reflection surface 23 and the downstream-side reflection surface 24 once converges and thereafter changes to diffused light and is transmitted through the emission-side lens surface 25. The emission-side lens surface 25 converges and emits the light reflected on the downstream-side reflection surface 24.

Figure 9:
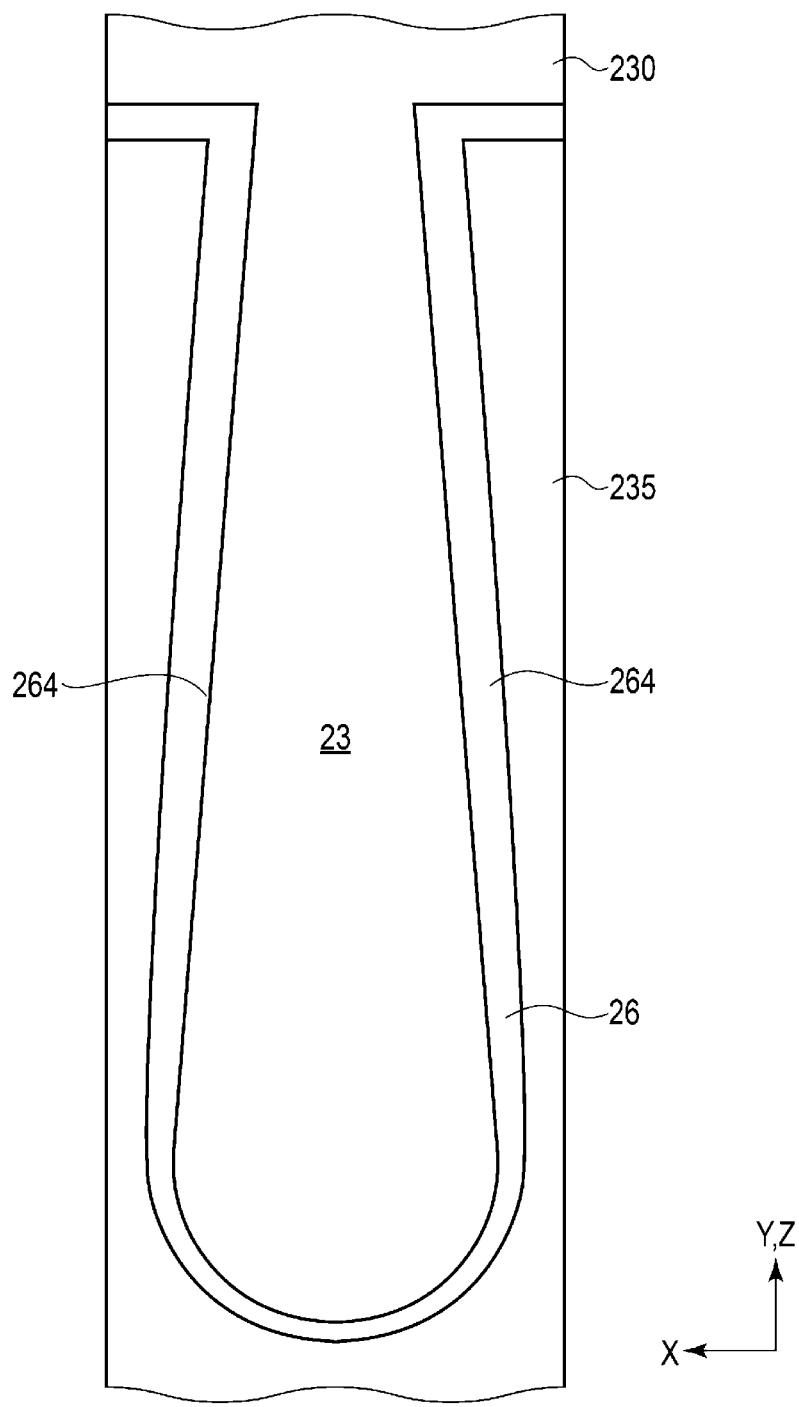
FIG. 9 is a plan view illustrating a modification of a stray light reflection surface illustrated in FIG. 7.

The stray light reflection surface 26 of the optical element 21 of the lens mirror array 20 may include a pair of inclined surfaces 264 continuous in the longitudinal direction of the upstream-side reflection surface 23 as illustrated in FIG. 9 instead of including the step-like three sets of inclined surfaces 261, 262, and 263 explained above. The inclined surfaces 264 are flat surfaces and are inclined in the same direction as the inclined surfaces 261 262, and 263 explained above.

If continuous one flat inclined surface 264 is expanded in a direction separating from the surface 230 as in the modification explained with reference to FIG. 9, the width in the X direction of the upstream-side reflection surface 23 gradually increases as the inclined surface 264 is farther apart from the surface 230. Therefore, in order to reduce the width in the X direction of the optical element 21 and dispose the plurality of optical elements 21 at high density in the X direction, the stray light reflection surface 26 including the step-like inclined surfaces 261, 262, and 263 illustrated in FIG. 8 is more advantageous than the stray light reflection surface 26 including the inclined surface 264 having the shape illustrated in FIG. 9.

A function of the stray light reflection surface 26 explained above is explained below with reference to FIG. 10.

Figure 10:
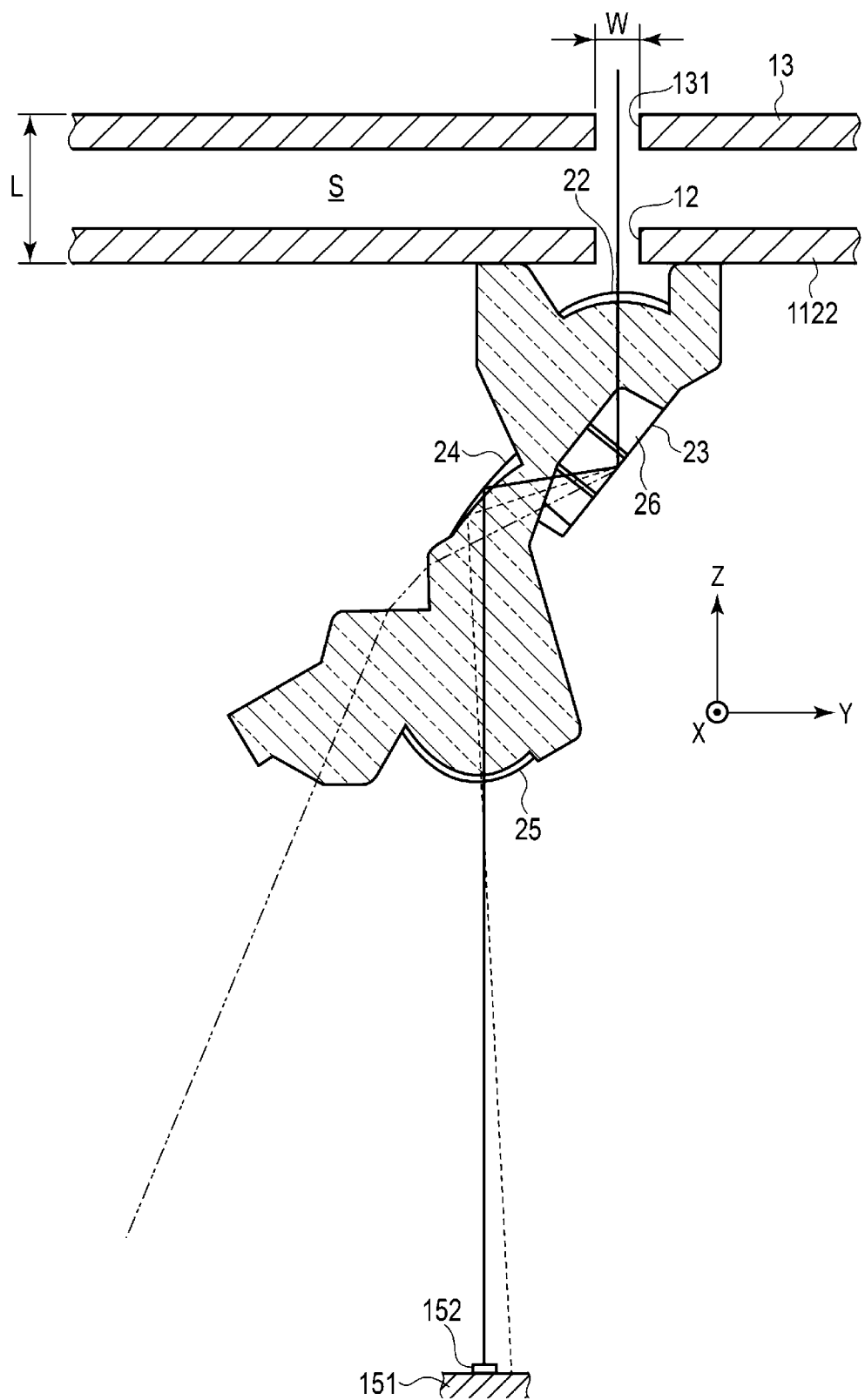
FIG. 10 is a schematic diagram for explaining a function of the stray light reflection surface illustrated in FIG. 7.

In FIG. 10, in reflected light from the original D, a principal ray of effective light passing through the slits 131 and 12 and made incident on the incident-side lens surface 22 of the lens mirror array 20 is indicated by a solid line. In light made incident on the lens mirror array 20 via the slits 131 and 12, a principal ray of stray light to be noise of effective light imaged on the light receiving surface of the imaging element 152 of the image sensor 15 is indicated by two dotted lines. Of the two dotted lines illustrated in FIG. 10, a broken line indicates the principal ray of the stray light reflected once on the stray light reflection surface 26 and an alternate long and two short dashes line indicates the principal ray of the stray light reflected twice on the stray light reflection surface 26. The stray light indicated by the dotted lines in FIG. 10 is only an example.

Since the stray light reflection surface 26 includes the three sets of inclined surfaces 261, 262, and 263 inclined in the direction explained above, the stray light reflection surface 26 is considered a surface inclined around a Y axis and inclined around a Z axis. Since the upstream-side reflection surface 23 is a surface inclined in the Y direction with respect to the optical axis of the incident-side lens surface 22, stray light reflected on the inclined surfaces 261, 262, and 263 of the stray light reflection surface 26 is light further deflected in the sub-scanning direction compared with stray light reflected on an imaginary surface parallel to the YZ plane orthogonal to the upstream-side reflection surface 23 (a not-inclined side surface of the upstream-side reflection surface 23). At this time, a deflection amount of the stray light in the sub-scanning direction increases as the number of times of reflection by the stray light reflection surface 26 (the inclined surfaces 261, 262, and 263) increases.

If focusing on the stray light indicated by the broken line (the stray light reflected once on the stray light reflection surface 26) having a relatively small deflection amount in the sub-scanning direction, an inclination direction and an inclination angle of the stray light reflection surface 26 only have to be designed such that the stray light reflected once on the stray light reflection surface 26 reaches at least a position deviating in the sub-scanning direction from the imaging element 152 of the image sensor 15. In this embodiment, the stray light reflection surface 26 is inclined at such an angle.

Subsequently, a function of the slit 12 of the swelling portion 1122 of the supporting body 11 and the slit 131 of the light blocking member 13 explained above is explained with reference to FIG. 3.

Light made incident on the original reading device 10 is made incident from all directions via the slit 131 of the light blocking member 13. If focusing on incident light traversing the YZ plane that passes the center in the X direction of the optical element 21, only light made incident from a range in a direction inclined at an angle of to in the Y direction with respect to the Z axis is made incident on the incident-side lens surface 22 passing through the two slits 131 and 12. A contour on the YZ plane of the light made incident on the incident-side lens surface 22 is indicated by a broken line in FIG. 3.

In other words, in this embodiment, a distance L in the Z direction between an edge in the sub-scanning direction on a light incident side of the slit 131 and an edge in the sub-scanning direction on a light emission side of the slit 12, width W between the edges in the sub-scanning direction of the slits 131 and 12, a distance between the edge on the light emission side of the slit 12 and the incident-side lens surface 22 in the Z direction, and width in the sub-scanning direction of the incident-side lens surface 22 are set to values at which incident light made incident via the two slits 131 and 12 is not made incident on a position deviating to the outer side in the sub-scanning direction of the incident-side lens surface 22. If the distance in the Z direction between the edge on the emission side of the slit 12 and the incident-side lens surface 22 and the width in the sub-scanning direction of the incident-side lens surface 22 are set to fixed values, the width in the sub-scanning direction of the incident light made incident on the incident-side lens surface 22 is determined by the width W and the distance L of the slits 131 and 12.

That is, by setting the width W and the distance L of the slits 131 and 12 to proper values, it is possible to prevent a deficiency in which incident light is made incident on the outer side in the sub-scanning direction of the incident-side lens surface 22 of the lens mirror array 20. Consequently, it is possible to eliminate, for example, a deficiency in which the incident light is irregularly reflected to cause stray light at a corner portion between the two projecting portions 225 and 226 present at both the ends in the sub-scanning direction of the incident-side lens surface 22.

The width in the sub-scanning direction of the slits 131 and 12 is desirably set to the same width W as in this embodiment. In order to control the width in the sub-scanning direction of the light made incident on the incident-side lens surface 22 of the lens mirror array 20, at least width W1 of the slit 131 present on the light incident side needs to be set to be equal to or smaller than width W2 of the slit 12 present on the lens mirror array 20 side. That is, the width W2 of the slit 12 may be set slightly larger than the width W1 of the slit 131. A light amount of the incident light can be increased by setting the width W2 larger. On the other hand, if the width W1 of the slit 131 is set larger than the width W2 of the slit 12, since a range of a light source that can be blocked is narrowed, W1 and W2 desirably satisfy a relation W1≤W2.

Instead of disposing the two slits 131 and 12 to be separated in the Z direction as in this embodiment, for example, the thickness in the Z direction of the top of the swelling portion 1122 may be set to the same thickness as the distance L, the light blocking member 13 may be omitted, and one slit having the width W in the Y direction piercing through the top of the swelling portion 1122 in the Z direction may be provided. In this modification as well, by setting length L in the Z direction and the width W in the Y direction of one slit to proper values, it is possible to prevent a deficiency in which incident light is made incident on the outer side in the sub-scanning direction of the incident-side lens surface 22 of the lens mirror array 20. It is possible to eliminate a deficiency of causing stray light.

By disposing the two slits 131 and 12 to be opposed to the incident-side lens surface 22 of the lens mirror array 20 and providing the space S having the width in the Z direction between the two slits 131 and 12, it is possible to cause most of unnecessary light made incident from the outer side of an angle range of ±α via the slit 131 of the light blocking member 13 to travel to the space S. In contrast, in the modification in which the top of the swelling portion 1122 is increased in thickness and the one slit is provided, although a light amount decreases, most of the unnecessary light made incident from the outer side in the angle range of ±α is reflected on the inner surface parallel to the XZ plane of the one slit and passes through the slit. Accordingly, by providing the two slits 131 and 12 and providing the space S between the slits 131 and 12 as in this embodiment, compared with the modification in which the one slit is provided, it is possible to more surely eliminate unnecessary light undesirably made incident on the original reading device 10.

As explained above, according to this embodiment, since the stray light reflection surfaces 26 of the plurality of optical elements 21 of the lens mirror array 20 of the original reading device 10 are inclined around the Y axis and inclined around the Z axis, it is possible to prevent a deficiency in which stray light reflected on the stray light reflection surfaces 26 is made incident on the imaging elements 152. It is possible to detect an image signal without noise. According to this embodiment, since the stray light reflected on the stray light reflection surfaces 26 is not made incident on the imaging elements 152, it is unnecessary to provide light blocking films on the side surfaces of the upstream-side reflection surfaces 23 (equivalent to the stray light reflection surface in this embodiment) unlike the related art. Therefore, it is possible to simplify a lens mirror array manufacturing process. Application spots and peeling of the light blocking films do not occur.

On the other hand, according to this embodiment, a light blocking film that less easily peels can also be provided on the stray light reflection surface 26 of the lens mirror array 20. As illustrated in FIG. 7, since the stray light reflection surface 26 is dispose at an obtuse angle with respect to the upstream-side reflection surface 23, the stray light reflection surface 26 has an obtuse angle with respect to the bottom surface of the groove 235 around the upstream-side reflection surface 23. Therefore, the light blocking film provided at the corner portion between the stray light reflection surface 26 and the bottom of the groove 235 can be prevented from easily peeling. Even if the light blocking film of the stray light reflection surface 26 peels, stray light reflected in a part where the light blocking film peels does not change to noise of effective light imaged on the imaging element 152 of the image sensor 15 unlike the above explanation.

According to this embodiment, since the diaphragm section that defines, in the sub-scanning direction, the incident light made incident on the incident-side lens surface 22 of the lens mirror array 20 includes the two slits 131 and 12 opposed across the space S in the Z direction, it is possible to substantially eliminate stray light caused to deviate from the incident-side lens surface 22 in the sub-scanning direction. It is possible to substantially eliminate unnecessary light other than effective light made incident within the width in the sub-scanning direction of the incident-side lens surface 22. Therefore, according to this embodiment, in addition to the effects by the stray light reflection surface 26 explained above, it is possible to eliminate the stray light and the unnecessary light made incident on the incident-side lens surface 22 of the lens mirror array 20. It is possible to detect a high-quality image signal without noise with the image sensor 15.

Example 1

Figure 11:
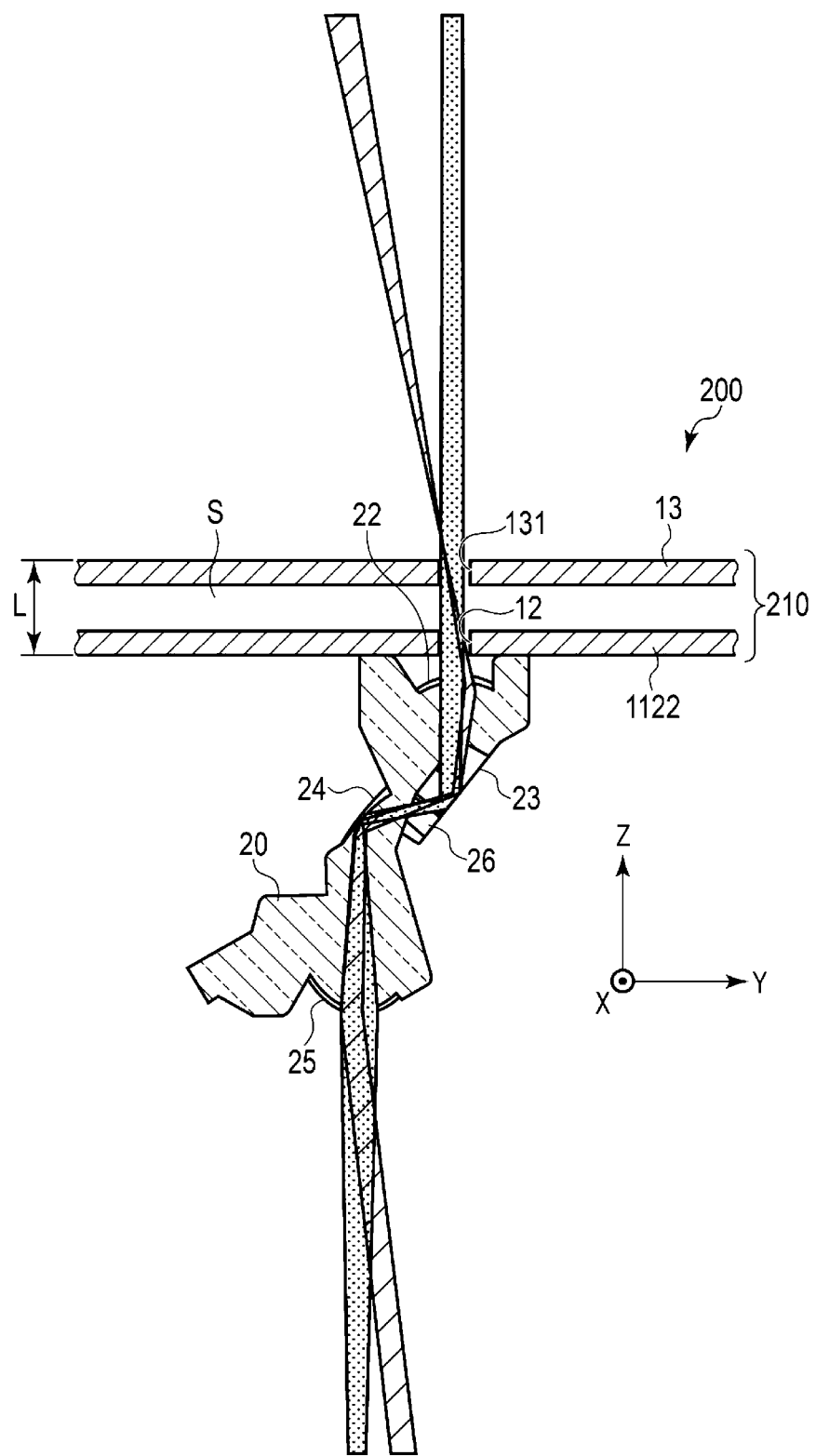
FIG. 11 is a schematic diagram illustrating an optical device in an example 1.

As an example 1, an optical device 200 illustrated in FIG. 11 was prepared in order to check the stray light reflected on the stray light reflection surface 26 of the lens mirror array 20 of the original reading device 10 in the embodiment explained above.

The optical device 200 includes a diaphragm section 210 opposed to the incident-side lens surface 22 of the lens mirror array 20. In the diaphragm section 210, a first light blocking plate 13 equivalent to the light blocking member 13 of the original reading device 10 in the embodiment explained above and a second light blocking plate 1122 equivalent to the top of the swelling portion 1122 of the supporting body 11 of the original reading device 10 are positioned to superimpose the slits 131 and 12 in the Z direction and are disposed in parallel to be separated from each other across the space S. The lens mirror array 20 is positioned and fixed with respect to the slits 131 and 12 in a state in which the contact surfaces 281 and 282 (FIG. 3) are set in contact with the surface of the second light blocking plate 1122.

The thickness in the Z direction of the first and second light blocking plates 13 and 1122 is 0.36 mm. The distance L between the surface on the light incident side of the first light blocking plate 13 and the surface on the lens mirror array 20 side of the second light blocking plate 1122 is 1.44 mm. The width in the Z direction of the space S present between the first and second light blocking plates 13 and 1122 is 0.72 mm. The width W in the sub-scanning direction of the slit 131 piercing through the first light blocking plate 13 is 0.48 mm. The width W in the sub-scanning direction of the slit 12 piercing through the second light blocking plate 1122 is 0.48 mm. The distance between the surface of the second light blocking plate 1122 and the incident-side lens surface 22 of the lens mirror array 20 is 0.34 mm. The width in the sub-scanning direction of the incident-side lens surface 22 is 1.13 mm. An aspect ratio (L/W) in the case in which the two slits 131 and 12 of the diaphragm section 210 are regarded as one slit is 3.

A read surface including a test image was set at an object point of the optical device 200, reflected light from the read surface was made incident on the lens mirror array 20 via the slits 131 and 12, and the image on the read surface was detected by an image sensor installed on the imaging surface. Optical paths of effective light guided in the optical device 200 and stray light having a relatively large light amount were measured and illustrated in FIG. 11.

As a result, it was found that, whereas the effective light was imaged on the imaging surface, the stray light reflected on the stray light reflection surface 26 was guided to a position deviating in the sub-scanning direction. In the example 1, a deviation amount in the sub-scanning direction between the effective light and the stray light on the imaging surface exceeded, in the sub-scanning direction, a detection region of a three-line sensor including the imaging elements 152 of three lines in the sub-scanning direction. It was found that the deviation amount related to an aspect ratio of the slit of the diaphragm section 210 and, if the aspect ratio is set to 3, it is possible to prevent a deficiency in which stray light is detected in a device including the three-line sensor.

Example 2

Figure 12:
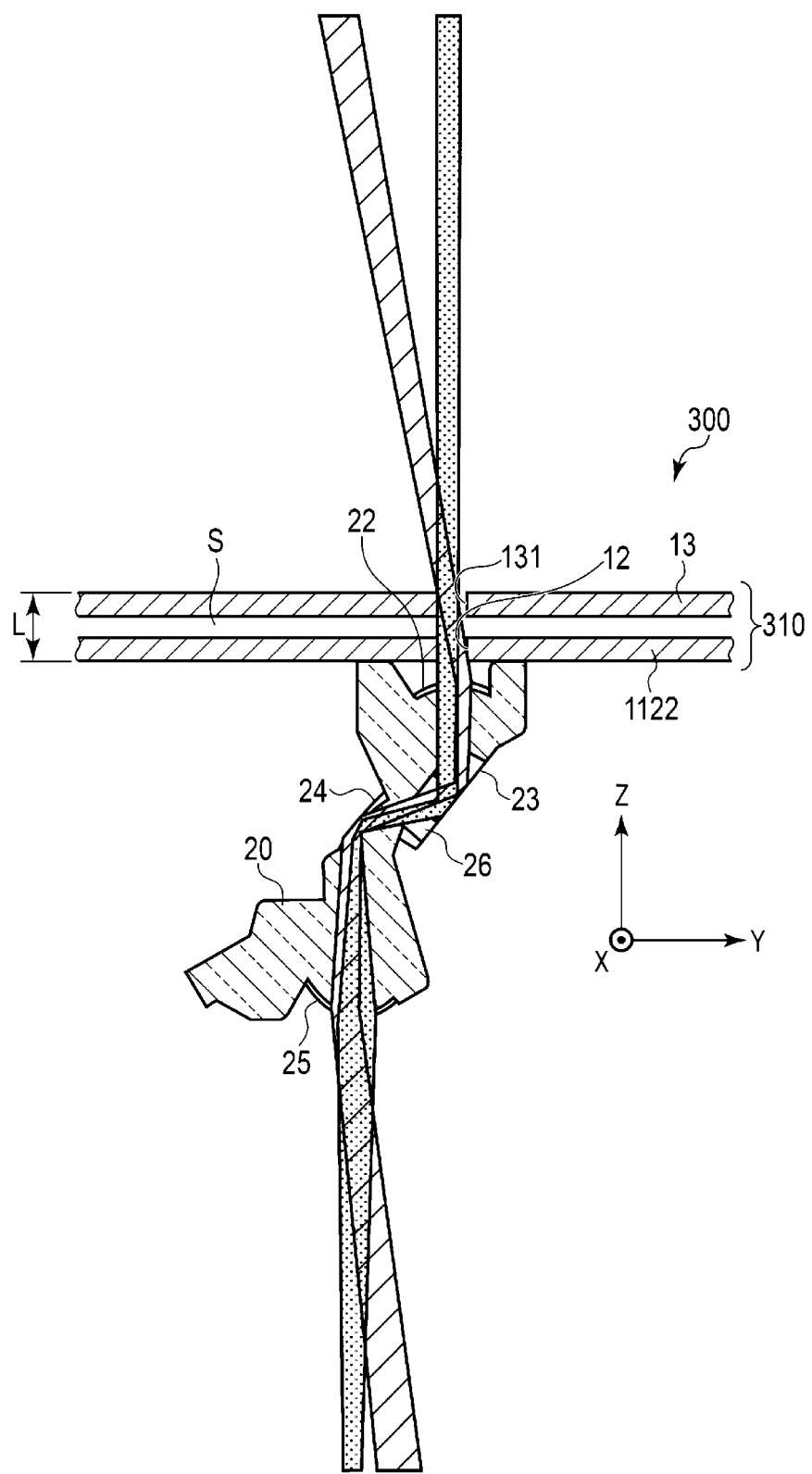
FIG. 12 is a schematic diagram illustrating an optical device in an example 2.

As an example 2, an optical device 300 illustrated in FIG. 12 was prepared.

The optical device 300 includes the same structure as the structure of the optical device 200 in the example 1 explained above except that the width of the space S between the first light blocking plate 13 and the second light blocking plate 122 was reduced. Accordingly, components functioning the same as the components of the optical device 200 are denoted by the same reference numerals and signs and detailed explanation of the components is omitted.

The width in the Z direction of the space S between the first light blocking plate 13 and the second light blocking plate 1122 of a diaphragm section 310 of the optical device 300 is 0.24 mm. The distance L between the surface on the light incident side of the first light blocking plate 13 and the surface on the lens mirror array 20 side of the second light blocking plate 1122 is 0.96 mm. An aspect ratio (L/W) in the case in which the two slits 131 and 12 of the diaphragm section 310 are regarded as one slit is 2.

A read surface including a test image was set at an object point of the optical device 300, reflected light from the read surface was made incident on the lens mirror array 20 via the slits 131 and 12, and the image on the read surface was detected by an image sensor installed on the imaging surface. Optical paths of effective light guided in the optical device 300 and stray light having a relatively large light amount were measured and illustrated in FIG. 12.

As a result, it was found that, whereas the effective light was imaged on the imaging surface, the stray light reflected on the stray light reflection surface 26 was guided to a position deviating in the sub-scanning direction. In the example 2, a deviation amount in the sub-scanning direction between the effective light and the stray light on the imaging surface exceeded, in the sub-scanning direction, a detection region of a one-line sensor in which the plurality of imaging elements 152 were disposed side by side in the main scanning direction. It was found that the deviation amount related to an aspect ratio of the slit of the diaphragm section 210 and, if the aspect ratio is set to 2, it is possible to prevent a deficiency in which stray light is detected in a device including the one-line sensor.

In the examples 1 and 2, the stray light was checked in the case in which the first and second light blocking plates 13 and 1122 were superimposed via the space S. However, it is known that, if the aspect ratio of the slit is set larger than 2, even a diaphragm section in which a slit is provided in one light blocking plate can separate the stray light reflected on the stray light reflection surface 26 in the sub-scanning direction with respect to the effective light as in the case of the examples 1 and 2 explained above.

Comparative Example

Figure 13:
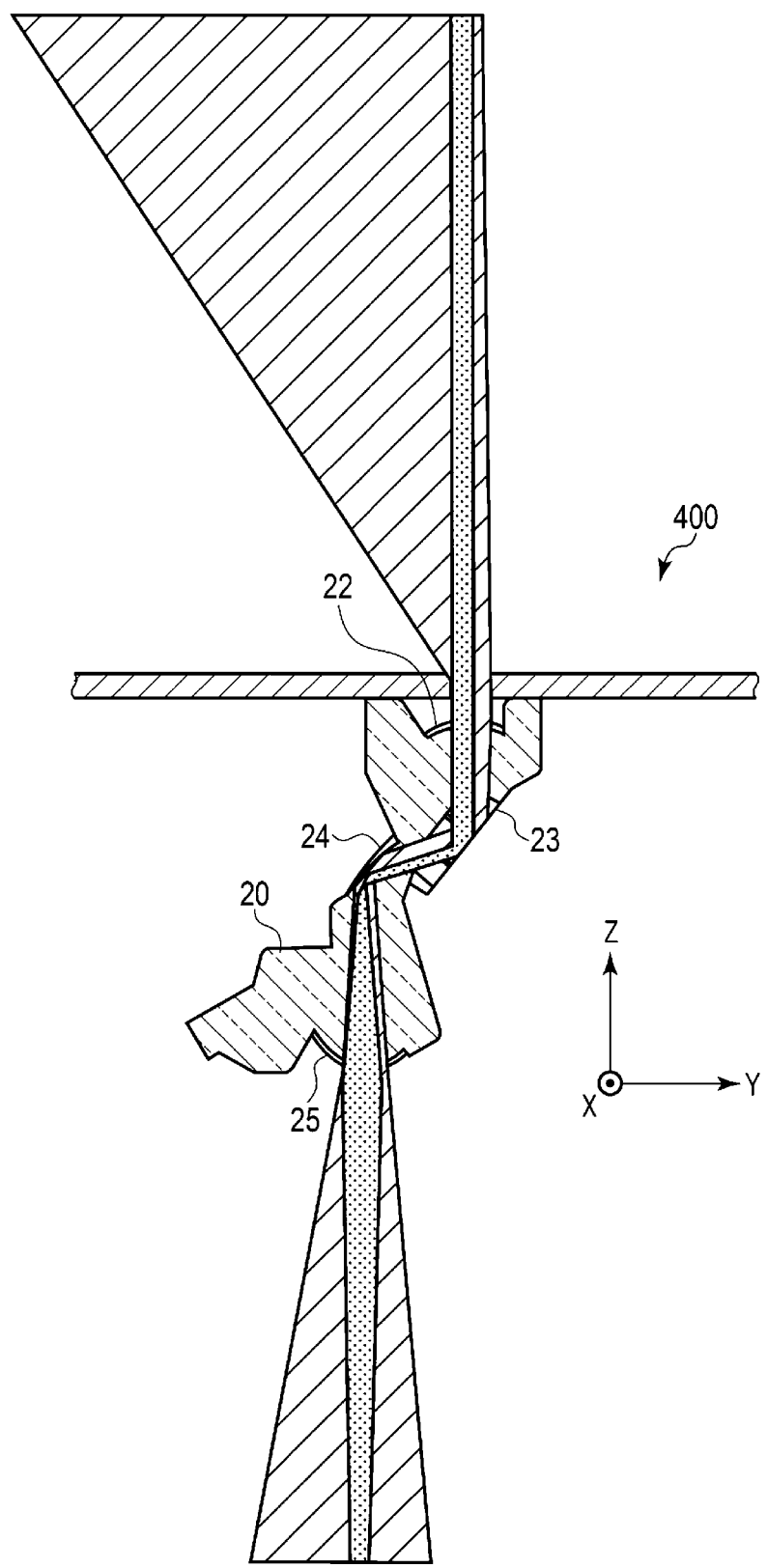
FIG. 13 is a schematic diagram illustrating an optical device in a comparative example.

In contrast, if an optical device 400 having the same structure as the structure of the optical device 200 explained above except that one light blocking plate was provided in the diaphragm section and an aspect ratio of a slit provided in the light blocking plate was set to smaller than 1 was prepared and stray light was checked, it was found that the effective light and the stray light overlap on the imaging surface. Optical paths of effective light and stray light having a relatively large light amount in this case are illustrated in FIG. 13.

In the embodiment explained above, the case in which the stray light reflection surface 26 of the lens mirror array 20 of the original reading device 10 is the flat inclined surface is explained. However, not only this, but the stray light reflection surface 26 may be a curved surface. The inclination directions of the three inclined surfaces 261, 262, and 263 formed in the step shape do not always need to be set the same and may be slightly differentiated. In any case, the stray light reflected on the stray light reflection surface 26 only has to be able to be separated in a direction deviating in the sub-scanning direction from the imaging element 152 disposed on the imaging surface.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image reading device, comprising:
 a lens mirror array including a plurality of optical elements integrally arrayed in a first direction, each of the optical elements including, on a surface thereof, an incident-side lens surface that transmits and converges reflected light from a read surface, an upstream-side reflection surface that reflects light made incident via the incident-side lens surface, a downstream-side reflection surface that reflects the light reflected on the upstream-side reflection surface, an emission-side lens surface that transmits and converges the light reflected on the downstream-side reflection surface and images the light on an imaging surface, and a stray light reflection surface that is inclined with respect to an imaginary surface orthogonal to the first direction and disposed continuously to a peripheral edge of the upstream-side reflection surface and reflects, with respect to effective light from the read surface imaged on the imaging surface, wherein stray light constitutes noise within the effective light in a direction separating in a second direction orthogonal to the first direction;

a photoelectric conversion section including the imaging surface and configured to receive, on the imaging surface, the reflected light from the read surface guided by the lens mirror array, photoelectrically convert the received reflected light, and output the reflected light as image information; and a diaphragm disposed between the read surface and the incident-side lens surface of the lens mirror array, including a slit-like opening section extending in the first direction that defines width in the second direction of the reflected light such that the reflected light from the read surface is made incident within a range of an effective width in the second direction of the incident-side lens surface, and including a surface that is in contact with the lens mirror array on both sides in the second direction of the opening section.

2. The image reading device according to claim 1, wherein, if a width in the second direction of the opening section of the diaphragm is represented as W and a length of the opening section in a third direction orthogonal to the first direction and the second direction is represented as L, L/W>2 is satisfied.

3. The image reading device according to claim 1, wherein the diaphragm includes:

a first light blocking plate having a thickness in a third direction orthogonal to the first direction and the second direction and including a slit-like first opening section extending in the first direction that allows the reflected light from the read surface to pass; and a second blocking plate having a thickness in the third direction, disposed in parallel on the lens mirror array side of the first light blocking plate to be separated from the first light blocking plate, and including a slit-like second opening section opposed to the third direction of the first opening section and extending in the first direction to allow light having passed through the first opening section to pass.

4. The image reading device according to claim 3, wherein, if a width in the second direction of the first opening section of the first light blocking plate and a width in the second direction of the second opening section of the second light blocking plate are represented as W and a distance between an end portion on the read surface side of the first opening section and an end portion on the lens mirror array side of the first opening section is represented as L, L/W>2 is satisfied.

5. The image reading device according to claim 3, wherein, if a width in the second direction of the first opening section of the first light blocking plate is represented as W1, a width in the second direction of the second opening section of the second light blocking plate is represented as W2, and a distance between an end portion on the read surface side of the first opening section and an end portion on the lens mirror array side of the first opening section is represented as L, W1≤W2 and L/W1>2 are satisfied.

6. The image reading device according to claim 1, wherein the stray light reflection surface of the lens mirror array is inclined at an obtuse angle with respect to the upstream-side reflection surface.

7. The image reading device according to claim 1, wherein the stray light reflection surface of the lens mirror array is inclined, in a direction extending from the incident-side lens surface toward the emission-side lens surface along the upstream-side reflection surface, in a direction separating from a center in the first direction of the upstream-side reflection surface.

8. The image reading device according to claim 6, wherein the stray light reflection surface of the lens mirror array is inclined, in a direction extending from the incident-side lens surface toward the emission-side lens surface along the upstream-side reflection surface, in a direction separating from a center in the first direction of the upstream-side reflection surface.

9. The image reading device according to claim 1, wherein the stray light reflection surface of the lens mirror array includes a light blocking film for cutting the stray light.

10. The image reading device according to claim 1, further comprising an illumination device configured to irradiate the read surface with illumination light.

11. An image forming apparatus, comprising:

a document feeder;

a photoconductive drum;

a developing device;

a fixing device;

an image reading device, comprising:

a lens mirror array including a plurality of optical elements integrally arrayed in a first direction, each of the optical elements including, on a surface thereof, an incident-side lens surface that transmits and converges reflected light from a read surface, an upstream-side reflection surface that reflects light made incident via the incident-side lens surface, a downstream-side reflection surface that reflects the light reflected on the upstream-side reflection surface, an emission-side lens surface that transmits and converges the light reflected on the downstream-side reflection surface and images the light on an imaging surface, and a stray light reflection surface that is inclined with respect to an imaginary surface orthogonal to the first direction and disposed continuously to a peripheral edge of the upstream-side reflection surface and reflects, with respect to effective light from the read surface imaged on the imaging surface, wherein stray light constitutes noise within the effective light in a direction separating in a second direction orthogonal to the first direction;

a photoelectric conversion section including the imaging surface and configured to receive, on the imaging surface, the reflected light from the read surface guided by the lens mirror array, photoelectrically convert the received reflected light, and output the reflected light as image information; and a diaphragm disposed between the read surface and the incident-side lens surface of the lens mirror array, including a slit-like opening section extending in the first direction that defines width in the second direction of the reflected light such that the reflected light from the read surface is made incident within a range of an effective width in the second direction of the incident-side lens surface, and including a surface that is in contact with the lens mirror array on both sides in the second direction of the opening section; and a paper discharge tray.

12. The image forming apparatus according to claim 11, wherein, if a width in the second direction of the opening section of the diaphragm is represented as W and a length of the opening section in a third direction orthogonal to the first direction and the second direction is represented as L, L/W>2 is satisfied.

13. The image forming apparatus according to claim 11, wherein the diaphragm includes:
   a first light blocking plate having a thickness in a third direction orthogonal to the first direction and the second direction and including a slit-like first opening section extending in the first direction that allows the reflected light from the read surface to pass; and
   a second blocking plate having a thickness in the third direction, disposed in parallel on the lens mirror array side of the first light blocking plate to be separated from the first light blocking plate, and including a slit-like second opening section opposed to the third direction of the first opening section and extending in the first direction to allow light having passed through the first opening section to pass.

14. The image forming apparatus according to claim 13, wherein, if a width in the second direction of the first opening section of the first light blocking plate and a width in the second direction of the second opening section of the second light blocking plate are represented as W and a distance between an end portion on the read surface side of the first opening section and an end portion on the lens mirror array side of the first opening section is represented as L, L/W>2 is satisfied.

15. The image forming apparatus according to claim 13, wherein, if a width in the second direction of the first opening section of the first light blocking plate is represented as W1, a width in the second direction of the second opening section of the second light blocking plate is represented as W2, and a distance between an end portion on the read surface side of the first opening section and an end portion on the lens mirror array side of the first opening section is represented as L, W1≤W2 and L/W1>2 are satisfied.

16. The image forming apparatus according to claim 11, wherein the stray light reflection surface of the lens mirror array is inclined at an obtuse angle with respect to the upstream-side reflection surface.

17. The image forming apparatus according to claim 11, wherein the stray light reflection surface of the lens mirror array is inclined, in a direction extending from the incident-side lens surface toward the emission-side lens surface along the upstream-side reflection surface, in a direction separating from a center in the first direction of the upstream-side reflection surface.

18. The image forming apparatus according to claim 16, wherein the stray light reflection surface of the lens mirror array is inclined, in a direction extending from the incident-side lens surface toward the emission-side lens surface along the upstream-side reflection surface, in a direction separating from a center in the first direction of the upstream-side reflection surface.

19. The image forming apparatus according to claim 11, wherein the stray light reflection surface of the lens mirror array includes a light blocking film for cutting the stray light.

20. The image forming apparatus according to claim 11, further comprising an illumination device configured to irradiate the read surface with illumination light.

* * * * *